United States Patent
Xia et al.

(10) Patent No.: US 9,431,051 B1
(45) Date of Patent: Aug. 30, 2016

(54) SYSTEMS AND METHODS FOR ACQUISITION PHASE GAIN MODIFICATION

(71) Applicant: Avago Technologies General IP (Singapore) Pte. Ltd., Singapore (SG)

(72) Inventors: Haitao Xia, San Jose, CA (US); Nayak Ratnakar Aravind, Allentown, PA (US); Lu Pan, Sr., San Jose, CA (US); Haotian Zhang, Longmont, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/844,864

(22) Filed: Sep. 3, 2015

(51) Int. Cl.
*G11B 5/09* (2006.01)
*G11B 20/10* (2006.01)
*G11B 20/12* (2006.01)

(52) U.S. Cl.
CPC ..... *G11B 20/10037* (2013.01); *G11B 20/1252* (2013.01); *G11B 2020/1232* (2013.01); *G11B 2020/1287* (2013.01)

(58) Field of Classification Search
CPC ... G11B 5/012; G11B 27/36; G11B 2220/90; G11B 20/10009; G11B 5/09; G11B 20/1426; G11B 20/1403; G11B 20/1252
USPC ........ 360/25, 31, 32, 39, 40, 46, 44, 51, 55, 360/72.1
See application file for complete search history.

(56) References Cited

U.S. PATENT DOCUMENTS

| | | | |
|---|---|---|---|
| 6,549,354 B1 * | 4/2003 | Ashley | G11B 5/09 360/46 |
| 8,773,811 B2 | 7/2014 | Xia et al. | |
| 8,917,468 B1 | 12/2014 | Singleton | |
| 2012/0092975 A1 | 4/2012 | Jun | |

* cited by examiner

*Primary Examiner* — Nabil Hindi

(57) ABSTRACT

Systems and methods relating generally to data processing, and more particularly to adjusting gain parameters in relation to data processing.

20 Claims, 4 Drawing Sheets

SYSTEMS AND METHODS FOR ACQUISITION PHASE GAIN MODIFICATION

FIELD OF THE INVENTION

Systems and methods relating generally to data processing, and more particularly to adjusting gain parameters in relation to data processing.

BACKGROUND

Processing a data set from a storage medium typically involves performing a timing acquisition process to synchronize to a received data set. When the timing is finally acquired, one or more data parameters may be modified using the data received after the timing synchronization is complete. Such an approach works well in some scenarios, but may result in increased overhead in other scenarios.

Hence, for at least the aforementioned reasons, there exists a need in the art for advanced systems and methods for accessing data from a storage medium.

SUMMARY

Systems and methods relating generally to data processing, and more particularly to adjusting gain parameters in relation to data processing.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Figure 1:
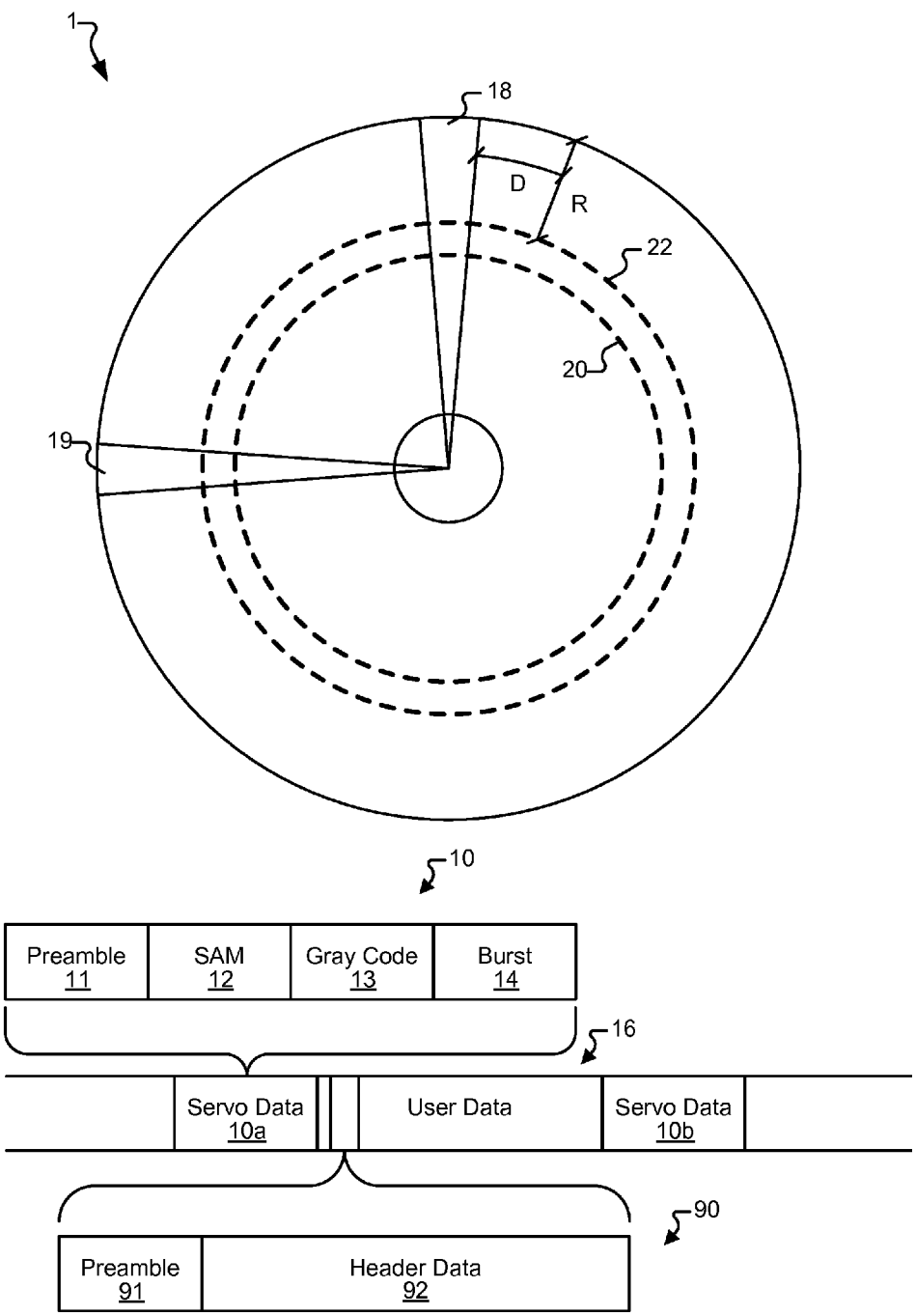
FIG. 1 is a block diagram of a storage medium and sector data schemes that may be used with a data processing system using multiple read sensors in accordance with one or more embodiments of the present invention.

Systems and methods relating generally to data processing, and more particularly to adjusting gain parameters in relation to data processing.

Various embodiments provide systems, circuits and/or methods for modifying gain feedback during acquisition phase processing. Such approaches, among other things, includes allowing for use of more samples of a preamble received during the acquisition phase without an increase in the number of preamble samples included in the overhead data constant. As used herein, the phrase "acquisition phase" is used in its broadest sense to mean an initial processing phase of a user data region, where the user data region is distinct from a servo data region.

Some embodiments provide data processing systems. The data processing systems include: an analog to digital converter circuit, an amplitude estimation circuit, a comparator circuit, an acquisition gain feedback calculation circuit, and a data correction circuit. The analog to digital converter circuit is operable to convert an analog input into a series of digital samples where the series of digital samples includes a preamble pattern. The amplitude estimation circuit is operable to estimate an amplitude of the series of digital samples corresponding to the preamble pattern received during acquisition phase processing. The comparator circuit is operable to compare the amplitude with a window threshold. The window threshold includes an upper limit and a lower limit. The acquisition gain feedback calculation circuit is operable to calculate a gain correction based at least in part on a result of comparing the amplitude with the window threshold, and the data correction circuit operable to correct the digital samples corresponding to the preamble pattern by an amount corresponding to the gain correction.

In some instances of the aforementioned embodiments where the window threshold is a first window threshold, the result is a first result, and the comparator is a first comparator circuit, the systems further include a second comparator circuit operable to compare the amplitude with a second window threshold to yield a second result. The gain calculation circuit is operable to calculate the gain correction based at least in part on the first result and the second result. In some cases, the acquisition gain feedback calculation circuit is operable to: apply a first correction algorithm to correct the digital samples corresponding to the preamble pattern when the amplitude is outside the second window threshold and within the first window threshold; and apply a second correction algorithm to correct the digital samples corresponding to the preamble pattern when the amplitude is outside both the second window threshold and the first window threshold. In some particular cases, the first correction algorithm includes multiplying a buffered version of the series of digital samples by an overall gain offset. In one particular case, the second correction algorithm includes incrementally multiplying on a period by period basis the buffered version of the series of digital samples by a period gain, where the period gain is the overall gain offset divided by a number of bit periods, and where the number of bit periods is greater than two.

In one or more cases where the analog input is a first analog input, the systems further include a variable gain amplifier circuit operable to amplify a second analog input by a variable gain corresponding to a gain feedback value to yield an amplified output. In such cases, the first analog input is derived from the amplified output. The acquisition gain feedback calculation circuit is operable to leave the gain feedback value unchanged when the amplitude is within the first window threshold, and to modify the gain feedback value when the amplitude is outside the first window threshold.

Other embodiments provide methods for modifying a gain feedback value. The methods include: receiving a first portion of data derived from a storage medium during a tracking phase; receiving a second portion of data derived from the storage medium during an acquisition phase; applying a first variable gain amplification to the first portion of data to yield a first amplified output, where the variable gain amplification is governed at least in part by a first gain feedback generated based upon the first portion of data; converting a first analog input corresponding to the first amplified output to a first series of digital samples; applying a second variable gain amplification to the second portion of data to yield a second amplified output, where the second variable gain amplification is governed at least in part by a second gain feedback; converting a second analog input corresponding to the second amplified output to a second series of digital samples; using an acquisition phase gain modification circuit to: estimate an amplitude of the second series of digital samples to yield an amplitude, and calculate a gain correction based at least in part on the amplitude; and correcting the second series of digital samples using the gain correction to yield corrected samples.

In some instances of the aforementioned embodiments, the methods further include: comparing the amplitude with a first window threshold to yield a first result, and comparing the amplitude with a second window threshold to yield a second result. Calculating the gain correction is based at least in part on a result of comparing the amplitude with the window threshold. In some cases, the second gain feedback is left unchanged when the amplitude is within the first window threshold. In other cases, the second gain feedback is modified when the amplitude is outside the first window threshold.

Turning to FIG. 1, a storage medium 1 is shown with two exemplary tracks 20, 22 that are adjacent to one another and indicated as dashed lines. The tracks are divided into sectors by servo data written within wedges 19, 18. These wedges include servo data 10 that are used for control and synchronization of a read/write head assembly over a desired location on storage medium 1. In particular, this servo data generally includes a preamble pattern 11 followed by a sector address mark 12 (SAM). Sector address mark 12 may include wedge identification information followed by the SAM. Sector address mark 12 is followed by a Gray code 13, and Gray code 13 is followed by burst information 14. Gray code 13 may include track identification information. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 14.

Between the servo data bit patterns 10a and 10b, a user data region 16 is provided. User data region 16 includes some synchronization and header data 90 that includes a preamble pattern 91 and a head data 92 followed by user data within user data region 16. Based upon the disclosure provided herein, one of ordinary skill in the art will recognize a variety of data that may be included in header data 92.

In operation, storage medium 1 is rotated in relation to a sensor that senses information from the storage medium. In a read operation, the sensor would sense servo data from wedge 19 (i.e., during a servo data period) followed by user data from a user data region between wedge 19 and wedge 18 (i.e., during a user data period) and then servo data from wedge 18. When reading data in user data region 16, synchronization to the data is done through use of preamble 91. In a write operation, the sensor would sense servo data from wedge 19 then write data to the user data region between wedge 19 and wedge 18. Then, the sensor would be switched to sense a remaining portion of the user data region followed by the servo data from wedge 18. Of note, wedges 18, 19 follow arcs corresponding to the geometry of an arm and pivot as is known in the art.

Codewords may be stored to the tracks on storage medium 1 in two different formats. In a parallel format 30, a given codeword is distributed across two tracks (e.g., tracks 20, 22). Parallel format 30 includes writing a first portion (e.g., CW1.A1 31) of a codeword to a first track and a second portion (e.g., CW1.A2 32) of the same codeword to a second track adjacent to the first track. This is followed by first portions of other codewords (e.g., CW2.B1 33, CWN.X1 35) stored serially along the first track, and second portions of other codewords (e.g., CW2.B2 34, CWN.X2 36) stored serially along the second track. The portions along the first track may be co-positioned with the portions along the second track such that portions for the same codeword can be read in parallel with one sensor of the head being disposed over one track and another sensor of the head disposed over the second track. Such parallel distribution of codeword portions allow for accessing a given codeword using multiple heads at a greater rate than if the codewords were accessed from a single track. In a serial format 40, codewords (e.g., CW1 41, CW2 42 and CWN 43) are placed in serial fashion along one track.

Figure 2:
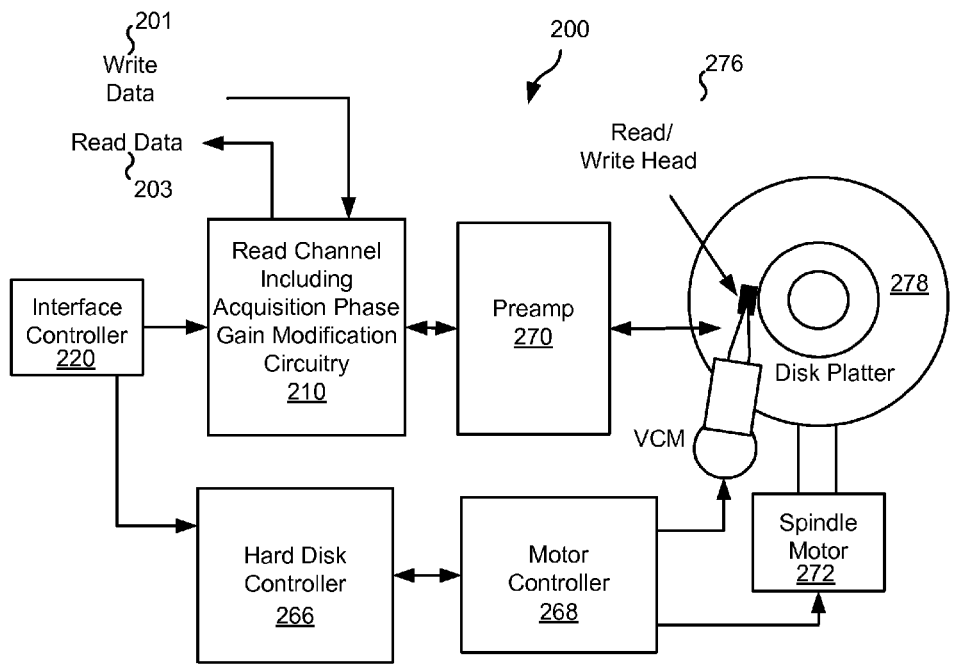
FIG. 2 shows a storage system that includes acquisition phase gain modification circuitry in accordance with various embodiments of the present invention.

Turning to FIG. 2, a storage system 200 is shown that includes a read channel 210 having acquisition phase gain modification circuitry in accordance with one or more embodiments of the present invention. In addition to read channel 210, storage system 200 includes a read/write head 276, a preamplifier circuit 270, an interface controller 220, a hard disk controller 266, a motor controller 268, a spindle motor 272, and a disk platter 278. Storage system 200 may be, for example, a hard disk drive. Read/write head 276 includes one or more read heads distributed at different locations along the read/write head, and at least one write head. Interface controller 220 controls addressing and timing of data to/from disk platter 278, and interacts with a host controller (not shown). The data on disk platter 278 consists of groups of magnetic signals that may be detected by read/write head assembly 276 when the assembly is properly positioned over disk platter 278. In one embodiment, disk platter 278 includes magnetic signals recorded in accordance with either a longitudinal or a perpendicular recording scheme.

In a typical read operation, read/write head 276 is accurately positioned by motor controller 268 over a desired data track on disk platter 278. Motor controller 268 both positions read/write head 276 in relation to disk platter 278 and drives spindle motor 272 by moving read/write head assembly 276 to the proper data track on disk platter 278 under the direction of hard disk controller 266. Spindle motor 272 spins disk platter 278 at a determined spin rate (RPMs). Once read/write head 276 is positioned adjacent the proper data track, magnetic signals representing data on disk platter 278 are sensed by each of the sensors included in three sensor read/write head 276 as disk platter 278 is rotated by spindle motor 272. The sensed magnetic signals are provided as a continuous, minute analog signal representative of the magnetic data on disk platter 278 with a signal stream being provided from each read head. These one or more minute analog signals are transferred from read/write head 276 to read channel circuit 210 via preamplifier 270. Preamplifier 270 is operable to amplify the individual minute analog signals accessed from disk platter 278. In turn, read channel circuit 210 processes the amplified signal(s) including combining the signals where two or more read heads are used and applying data decoding to the single or combined signals to recreate the information originally written to disk platter 278. This data is provided as read data 203 to a receiving circuit. A write operation is substantially the opposite of the preceding read operation with write data 201 being provided to read channel circuit 210. This data is then encoded and written to disk platter 278.

As part of processing data derived from the one or more read heads included in read/write head 276, an acquisition phase is traversed during which timing and phase alignment with data received from disk platter 278 is performed. Once the timing and phase alignment is achieved, standard processing of the data retrieved from disk platter 278 is performed during a tracking phase. Gain parameters used to control a variable gain amplifier included as part of read channel 210 are modified both in the acquisition phase and in the tracking phase. Modification of the gain parameters during the acquisition phase may be done using an acquisition phase gain modification circuit similar to that discussed below in relation to FIG. 3, and/or may be performed using the method discussed below in relation to FIG. 5.

It should be noted that storage system 200 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 200, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 210 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 200 may be modified to include solid state memory that is used to store data in addition to the storage offered by disk platter 278. This solid state memory may be used in parallel to disk platter 278 to provide additional storage. In such a case, the solid state memory receives and provides information directly to read channel circuit 210. Alternatively, the solid state memory may be used as a cache where it offers faster access time than that offered by disk platted 278. In such a case, the solid state memory may be disposed between interface controller 220 and read channel circuit 210 where it operates as a pass through to disk platter 278 when requested data is not available in the solid state memory or when the solid state memory does not have sufficient storage to hold a newly written data set. Based upon the disclosure provided herein, one of ordinary skill in the art will recognize a variety of storage systems including both disk platter 278 and a solid state memory.

Figure 3:
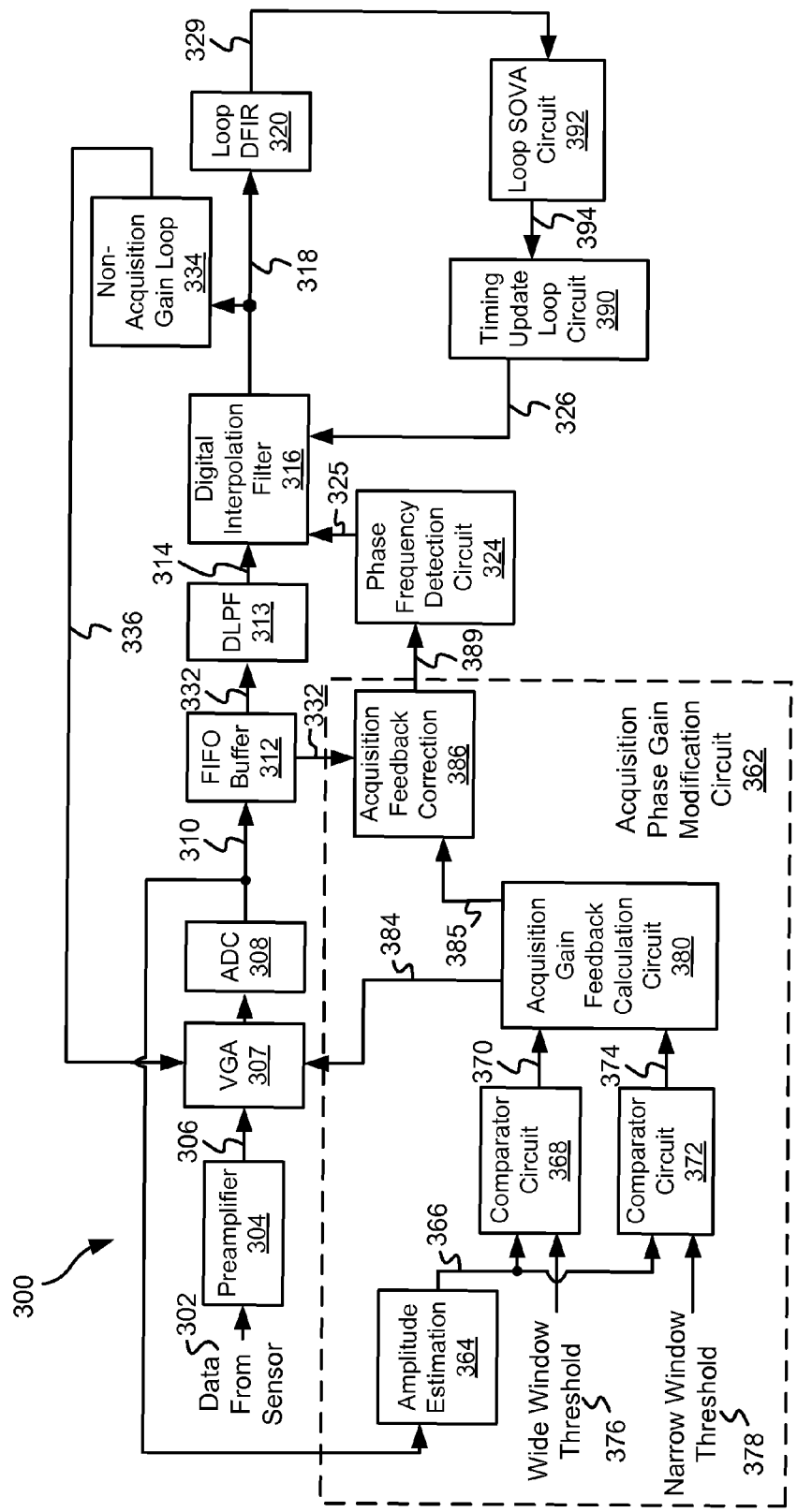
FIG. 3 is a block diagram of a data processing circuit including acquisition phase gain modification circuitry in accordance with some embodiments of the present invention.

Turning to FIG. 3, a block diagram of a data processing circuit 300 including an acquisition phase gain modification circuit 362 in accordance with some embodiments of the present invention. Data processing circuit 300 includes a preamplifier circuit 304 that receives data 302 from a read head included as part of a read/write head (not shown). Data 302 is received as an analog signal derived from sensing information from a track on the storage medium (not shown). Preamplifier circuit 304 amplifies data 302 to yield an amplified signal 306 that is provided to a variable gain amplifier circuit 307 that amplifies amplified signal 306 in accordance with an acquisition gain feedback value 384 or a non-acquisition gain feedback value 336 to yield a variably amplified output that is provided to an analog to digital converter circuit 308. Analog to digital converter circuit 308 converts the aforementioned variably amplified output to yield a series of corresponding digital samples 310. Based upon the disclosure provided herein, one of ordinary skill in the art will recognize various analog to digital conversion circuits that may be used in relation to different embodiments of the present invention. Of note, other circuitry may be included in addition to variable gain amplifier circuit 307 and analog to digital converter circuit 308 as part of overall analog front end processing circuitry. Such other circuitry may include, but is not limited to, an analog filter, DC offset (not shown), and magneto resistive asymmetry (MRA) modification circuitry (not shown). Based upon the disclosure provided herein, one of ordinary skill in the art will recognize a variety of circuitry in addition to variable gain amplifier circuit 307 and analog to digital converter circuit 308 that may be included as part of overall analog front end circuitry.

Digital samples 310 are provided to a first in/first out buffer circuit 312 where digital samples 310 are stored as buffered samples 332. Buffered samples 332 are provided to a digital low pass filter circuit 313 that applies digital low pass filtering to the received samples to yield filtered samples 314. Filtered samples 314 are provided to a digital interpolation filter circuit 316. Digital interpolation filter circuit 316 interpolates filtered samples 314 in accordance with a phase adjustment 325 and a loop timing feedback 326 to yield interpolated samples 318. As more fully discussed below, phase adjustment 325 is calculated to align the received data with a better sample point which makes the retrieved data more easily discerned by a downstream data decoder circuit. The data used to calculate the phase adjustment generated differently depending upon whether the processing is in acquisition phase processing mode (i.e., the processing of header data associated with a user data set) or tracking phase processing mode (i.e., the processing of user data in the data set that follows the header data).

Figure 4:
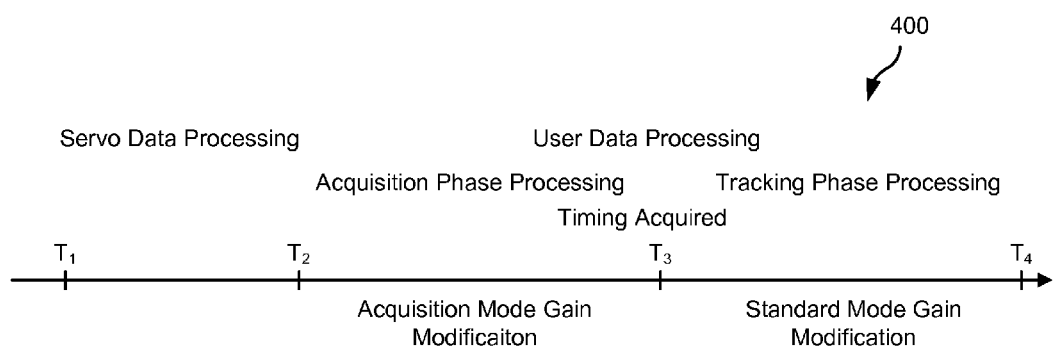
FIG. 4 is a timeline showing various data processing processes performed including acquisition mode gain modification in accordance with some embodiments of the present invention.

Turning to FIG. 4, a timeline 400 shows the timing of various data processing processes performed including acquisition mode gain modification. In particular, between a time $T_1$ to $T_2$, servo data processing is performed on data from servo wedges (e.g., wedge 18 of FIG. 1). Between a time $T_2$ to $T_4$, user data processing is performed on data from a user data region (e.g., user data 16) following the preceding servo wedge. During a first portion (i.e., from $T_2$ to $T_3$) when the user data is being processed, acquisition phase processing is performed where timing and phase information for the data received from the user data region is generated in preparation for receiving and processing later user data. At time $T_3$ where timing information generated during acquisition phase processing is available, processing transitions to tracking phase processing which continues until time $T_4$.

Turning again to FIG. 3, interpolated samples 318 are provided to a non-acquisition gain loop circuit 334 that calculates non-acquisition gain feedback value 336. Non-acquisition gain feedback value 336 is used during tracking phase processing (i.e., from $T_2$ to $T_3$ of FIG. 4) by variable gain amplifier circuit 307. Acquisition gain feedback value 384 is not used by variable gain amplifier circuit 307 during tracking phase processing. Non-acquisition gain loop circuit 334 may be any circuit known in the art for generating a gain feedback value using interpolated samples generated during tracking phase processing.

Interpolated samples 318 are provided to a loop digital finite impulse response filter circuit 320 that equalizes interpolated data 318 to yield an equalized output 329. Equalized output 329 is provided to a loop soft output Viterbi algorithm (SOVA) circuit 392 that applies a SOVA algorithm to yield a decision output 394. Decision output 394 is provided to timing update loop circuit 390 that modifies loop timing feedback 326. In contrast to a phase frequency detection circuit 324 that operates to modify phase during acquisition mode, timing update loop 390 operates to adjust phase during tracking phase processing.

Digital samples 310 and buffered samples 332 are provided to acquisition phase gain modification circuit 362. Acquisition phase gain modification circuit 362 includes an amplitude estimation circuit 364. Amplitude estimation circuit 364 estimates an amplitude of digital samples 310 and provides the estimate as an estimated amplitude output 366. The amplitude estimation may be done, for example, using a zero gain start (ZGS) circuit as are known in the art. Based upon the disclosure provided herein, one of ordinary skill in the art will recognize other approaches and/or circuitry that may be used to estimate the amplitude of digital samples 310.

Estimated amplitude output 366 is provided to a comparator circuit 368 and a comparator circuit 372. Comparator circuit 368 compares estimated amplitude output 366 with a wide window threshold 376 to yield a wide comparison output 370, and comparator circuit 372 compares estimated amplitude output 366 with a narrow window threshold 378 to yield a narrow comparison output 374. In some embodiments, wide window threshold 376 represents a first window around an expected amplitude and includes an upper threshold which is an expected amplitude plus a wide offset and a lower threshold which is the expected amplitude minus the wide offset. The expected amplitude and/or the wide offset may be user programmable. Similarly, narrow window threshold 378 represents a second window around the expected amplitude and includes an upper threshold which is an expected amplitude plus a narrow offset and a lower threshold which is the expected amplitude minus the narrow offset. Where the narrow offset is less than the wide offset, the narrow window is within the wide window. The narrow offset may be user programmable. Narrow comparison output 374 is asserted whenever estimated amplitude output 366 is within a narrow window (i.e., the expected amplitude+/−narrow offset), and wide comparison output 370 is asserted whenever estimated amplitude output 366 is within a wide window (i.e., the expected amplitude+/−wide offset). In a case where the narrow offset is less than the wide offset, then whenever narrow comparison output 374 is asserted, wide comparison output 370 is also asserted. When wide comparison output 370 is asserted and narrow comparison output 374 is not asserted, then estimated amplitude output 366 is outside of the narrow window and within the wide window. When neither wide comparison output 370 not narrow comparison output 374 are asserted, then estimated amplitude output 366 is outside of the wide window.

Wide comparison output 370 and narrow comparison output 374 are provided to an acquisition gain feedback calculation circuit 380. When narrow comparison output 374 is asserted, estimated amplitude output 366 is near the expected amplitude and acquisition gain feedback calculation circuit 380 provides a default gain value as acquisition gain feedback value 384 (i.e., acquisition gain feedback calculation circuit 380 does not modify the gain applied by variable gain amplifier circuit 307). In addition, acquisition gain feedback calculation circuit 380 sets a buffered sample scalar value 385 to unity (i.e., '1').

Alternatively, when narrow comparison output 374 is not asserted and wide comparison output 370 is asserted, estimated amplitude output 366 is an intermediate distance from the expected amplitude. In such a situation, acquisition gain feedback calculation circuit 380 calculates an overall gain offset. The overall gain offset is the magnitude and direction that the gain applied by variable gain amplifier circuit 307 would have to be adjusted to increase or decrease digital samples 310 to match the expected amplitude. Acquisition gain feedback calculation circuit 380 sets a buffered sample scalar value 385 to a positive value (greater than unity) where estimated amplitude output 366 is less than the expected amplitude minus the narrow offset, or sets buffered sample scalar value 385 to a negative value (less than unity) where estimated amplitude output 366 is greater than the expected amplitude plus the narrow offset. The magnitude of buffered sample scalar value 385 corresponds to the calculated overall gain offset. In addition, acquisition gain feedback calculation circuit 380 provides a default gain value as acquisition gain feedback value 384 (i.e., acquisition gain feedback calculation circuit 380 does not modify the gain applied by variable gain amplifier circuit 307).

As yet another alternative, when wide comparison output 370 is not asserted, estimated amplitude output 366 is an extended distance from the expected amplitude. In such a situation, acquisition gain feedback calculation circuit 380 calculates an overall gain offset and a period gain. The overall gain offset is the magnitude and direction that the gain applied by variable gain amplifier circuit 307 would have to be adjusted to increase or decrease digital samples 310 to match the expected amplitude. The period gain is the overall gain divided by a number of bit periods over which the gain will be modified to achieve the overall gain. The number of bit periods are the number of periods (or less than the number of periods) remaining in the region over which the acquisition phase processing is performed. In some embodiments, this number of periods is fixed, while in other embodiments this number of periods is user programmable.

Acquisition gain feedback calculation circuit 380 sets buffered sample scalar value 385 to a positive value (greater than unity) corresponding to the period gain where estimated amplitude output 366 is less than the expected amplitude minus the narrow offset, or sets buffered sample scalar value 385 to a negative value (less than unity) corresponding to the period gain where estimated amplitude output 366 is greater than the expected amplitude plus the narrow offset. In addition, acquisition gain feedback calculation circuit 380 increments acquisition gain feedback value 384 from the default value on a period by period basis by an offset corresponding to the period gain until the overall gain is achieved. By incrementally introducing changes to acquisition gain feedback value 384 rather than instantaneously introducing the overall gain, operational instability due to parameter change is reduced.

Buffered samples 332 are provided to an acquisition feedback correction circuit 386 that multiplies buffered samples 332 by buffered sample scalar value 385 to yield scaled samples 389. Where narrow comparison output 374 is asserted, scaled samples 389 are the same as buffered samples 332 (i.e., buffered sample scalar value 385 is set to unity). Alternatively, where narrow comparison output 374 is not asserted, scaled samples 389 are a scaled version of buffered samples 332 (i.e., buffered sample scalar value 385 is greater than or less than unity). Scaled samples 389 are provided to phase/frequency detection circuit 324. Upon receiving a complete preamble for a given user data set (e.g., preamble 91 of FIG. 1), phase frequency detection circuit 324 calculates phase adjustment 325 which is to be applied to all user data maintained in the memory buffer of filter and buffer circuit 312 by a digital interpolation filter 316. Phase adjustment 325 is calculated to align the received data with a better sample point which makes the retrieved data more easily discerned by a downstream data decoder circuit. The phase adjustment is calculated differently depending upon whether the processing is in acquisition mode (i.e., the processing of header data associated with a user data set) or tracking mode (i.e., the processing of user data in the data set that follows the header data). Phase frequency detection circuit 324 may be implemented as any circuit known in the art to detect a phase/frequency offset. Based upon the disclosure provided herein, one of ordinary skill in the art will recognize a variety of circuits that may be used to perform the function of phase frequency detection circuit 324.

During tracking phase processing, gain adjustment is performed consistent with other circuits known in the art. As discussed above, data processing circuit 300 additionally performs gain adjustment during acquisition phase processing. Such gain adjustment during acquisition phase processing includes variable gain amplifier circuit 307 amplifying amplified signal 306 by a variable gain controlled by acquisition gain feedback value 384 to yield variably amplified output (non-acquisition gain feedback value 336 is not used during acquisition phase processing). Analog to digital converter circuit 308 converts the variably amplified output into a corresponding series of digital samples 310. Digital samples 310 are stored to FIFO buffer 312.

The amplitude of digital samples 310 is estimated by amplitude estimation circuit 364 to yield estimated amplitude 366. Based upon wide comparison output 370 and narrow comparison output 374, gain feedback calculation circuit 380 determines whether estimated amplitude 366 is within a narrow window defined by narrow window threshold 378 and/or a wide window defined by wide threshold 376. Where gain feedback calculation circuit 380 determines that estimated amplitude 366 is within the narrow window, estimated amplitude 366 is near the expected amplitude, and gain feedback calculation circuit sets buffered sample scalar value 385 to unity and leaves acquisition gain feedback value 384 unchanged. Alternatively, where gain feedback calculation circuit 380 determines that estimated amplitude 366 is not within the narrow window, gain feedback calculation circuit 380 calculates the overall gain offset. The process of modifying the gain continues only during the acquisition phase processing. Once the tracking phase processing begins, gain feedback calculation circuit 380 sets buffered sample scalar value 385 to unity, and variable gain amplifier 307 uses non-acquisition gain feedback value 336 to guide application of the variable gain and ignores acquisition gain feedback value 384.

Where gain feedback calculation circuit 380 additionally determines that estimated amplitude 366 is within the wide window, estimated amplitude 366 is an intermediate distance from the expected amplitude. In such a case, gain feedback calculation circuit 380 leaves acquisition gain feedback value 384 unchanged and modifies buffered sample scalar value 385 to compensate for the overall gain offset. In particular, where the overall gain offset is positive indicating a need for increasing the gain applied by the variable gain amplification process, gain feedback calculation circuit 380 sets buffered sample scalar value 385 to greater than unity by an amount corresponding to the magnitude of the overall gain offset. Otherwise, where the overall gain offset is negative indicating a need for decreasing the gain applied by the variable gain amplification process, gain feedback calculation circuit 380 sets buffered sample scalar value 385 to less than unity by an amount corresponding to the magnitude of the overall gain offset. Said another way, the gain being applied by variable gain amplifier circuit 307 is not changed, but buffered samples 332 are scaled by acquisition feedback circuit 386 by an amount indicated by buffered sample scalar value 385. The process of modifying the gain continues until the tracking phase processing begins. Once the tracking phase processing begins, gain feedback calculation circuit 380 sets buffered sample scalar value 385 to unity, and variable gain amplifier 307 uses non-acquisition gain feedback value 336 to guide application of the variable gain and ignores acquisition gain feedback value 384.

Alternatively, where gain feedback calculation circuit 380 additionally determines that estimated amplitude 366 is not within the wide window, estimated amplitude 366 is an extended distance from the expected amplitude. In such a case, gain feedback calculation circuit 380 divides the previously calculated overall gain offset by a number of bit periods over which the gain will be modified to achieve the overall gain. This division yields a period gain. Gain feedback calculation circuit 380 incrementally modifies buffered sample scalar value 385 to reflect the period gain. This incremental application includes setting buffered sample scalar value 385 to correspond to the period gain for a first bit period, and increasing buffered sample scalar value 385 by the period gain for each subsequent bit period. Thus, during the second bit period buffered sample scalar value 385 reflects two times the period gain, during the third bit period buffered sample scalar value 385 reflects three times the period gain, and so on. In addition, gain feedback calculation circuit 380 incrementally modifies acquisition gain feedback value 384 to reflect the period gain. This incremental modification of acquisition gain feedback value 384 includes modifying acquisition gain feedback value 384 to introduce a change corresponding to the period gain for a first bit period, and increasing (or decreasing) the gain feedback by an amount corresponding to the period gain for each subsequent bit period. Thus, during the second bit period the gain feedback is modified to reflect two times the period gain, during the third bit period the gain feedback is modified to reflect three times the period gain, and so on. The process of modifying the gain continues until the overall gain offset is achieved by incrementally applying the period gain or until the tracking phase processing begins. Once the tracking phase processing begins, gain feedback calculation circuit 380 sets buffered sample scalar value 385 to unity, and variable gain amplifier 307 uses non-acquisition gain feedback value 336 to guide application of the variable gain and ignores acquisition gain feedback value 384.

Figure 5:
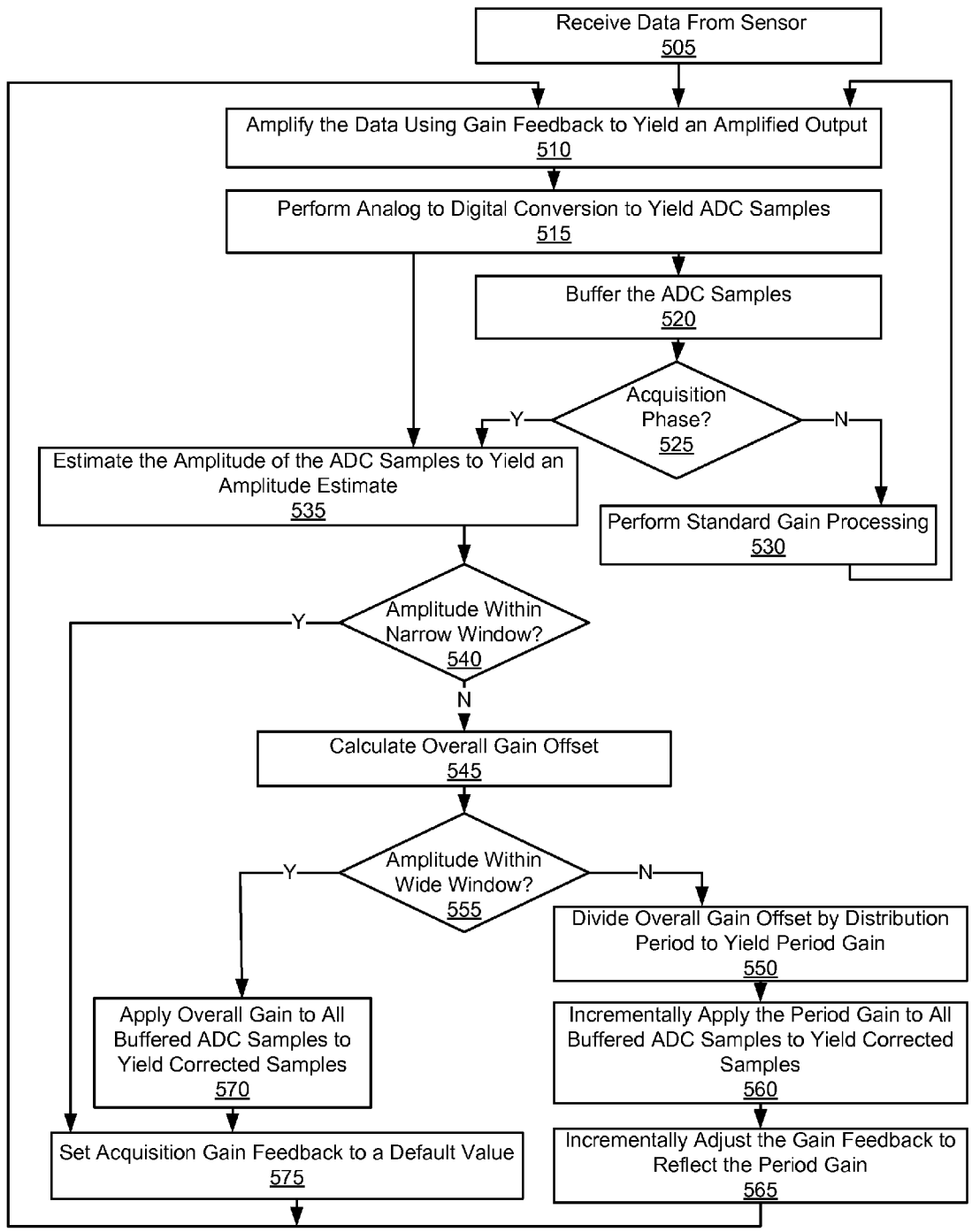
FIG. 5 is a flow diagram showing a method in accordance with some embodiments of the present invention for acquisition phase gain modification.

Turning to FIG. 5, a flow diagram 500 shows a method in accordance with some embodiments of the present invention for acquisition phase gain modification. Following flow diagram 500, data is received from a sensor or read head as the sensor flies over a track of a storage medium after being amplified by a preamplifier circuit (block 505). The received data is amplified by a gain feedback to yield an amplified output (block 510), and an analog to digital conversion is applied to the amplified output to yield a series of digital samples (i.e., ADC samples) (block 515). The resulting series of ADC samples are stored to a buffer (block 520). The buffer is a first in/first out buffer such that the samples are accessed from the buffer in the order in which they were received.

It is determined whether the data processing system is performing acquisition phase processing or tracking phase processing (block 525). In some embodiments, a signal is provided that indicates whether the data processing system is operating in the acquisition phase or the tracking phase. Where it is determined that the data processing system is not performing acquisition phase processing (block 525), then standard gain processing is performed (block 530). Such standard gain processing includes updating the gain feedback that controls the variable gain amplification of block 510 using any approach known in the art for modifying a gain feedback value during tracking phase processing.

Alternatively, where it is determined that the data processing system is performing acquisition phase processing (block 525), the amplitude of the ADC samples is estimated (block 535). This amplitude estimation may be done, for example, using a zero gain start (ZGS) circuit as are known in the art. Based upon the disclosure provided herein, one of ordinary skill in the art will recognize approaches and/or circuitry that may be used to estimate the amplitude of the ADC samples to yield an estimated amplitude.

It is determined whether the estimated amplitude is within a narrow window (block 540). This is determined by comparing the estimated amplitude with an upper threshold of the narrow window and a lower threshold of the narrow window. The upper threshold is an expected amplitude plus a narrow offset and the lower threshold is the expected amplitude minus the narrow offset. Where it is determined that the estimated amplitude is within the narrow window (block 540), the estimated amplitude is near the expected amplitude and the gain feedback is set equal to a default value (block 575). Said another way, the gain being applied by the variable gain amplification of block 510 is not changed.

Alternatively, where it is determined that the estimated amplitude is not within the narrow window (block 540), an overall gain offset is calculated (block 545). The overall gain offset is the magnitude and direction that the gain applied by variable gain amplification of block 510 would have to be adjusted to increase or decrease the ADC samples to match the expected amplitude. It is then determined whether the estimated amplitude is within a wide window (block 555). This is determined by comparing the estimated amplitude with an upper threshold of the wide window and a lower threshold of the wide window. The upper threshold is an expected amplitude plus a wide offset and the lower threshold is the expected amplitude minus the wide offset. Where it is determined that the estimated amplitude is within the wide window (block 555), the estimated amplitude is an intermediate distance from the expected amplitude. In such a case, the overall gain offset is applied to all buffered ADC samples to yield corrected samples (block 570). This is done by calculating a scalar value that corresponds to the overall gain offset. In particular, where the overall gain offset is positive indicating a need for increasing the gain applied by the variable gain amplification process, then the scalar is greater than unity by an amount corresponding to the magnitude of the overall gain offset. Otherwise, where the overall gain offset is negative indicating a need for decreasing the gain applied by the variable gain amplification process, then the scalar is less than unity by an amount corresponding to the magnitude of the overall gain offset. In addition, the gain feedback is set equal to a default value (block 575). Said another way, the gain being applied by the variable gain amplification of block 510 is not changed, but the ADC samples are scaled to reflect the overall gain offset.

Alternatively, where it is determined that the estimated amplitude is outside the wide window (block 555), the estimated amplitude is an extended distance from the expected amplitude. In such a case, the overall gain offset is divided by a number of bit periods over which the gain will be modified to achieve the overall gain. The number of bit periods are the number of periods (or less than the number of periods) remaining in the period over which the acquisition phase processing is performed. In some embodiments, this number of periods is fixed, while in other embodiments this number of periods is user programmable.

The period gain is incrementally applied to all buffered ADC samples to yield corrected samples (block 560). This incremental application includes setting a scalar by which the ADC samples will be multiplied equal to the period gain for a first bit period, and increasing the scalar by the period gain for each subsequent bit period. Thus, during the second bit period the scalar is set to two times the period gain, during the third bit period the scalar is set to three times the period gain, and so on. In addition, the gain feedback used to control the variable gain multiplication is incrementally adjusted to reflect the period gain (block 565). This incremental adjustment of the gain feedback includes modifying the gain feedback to introduce a change corresponding to the period gain for a first bit period, and increasing (or decreasing) the gain feedback by an amount corresponding to the period gain for each subsequent bit period. Thus, during the second bit period the gain feedback is modified to reflect two times the period gain, during the third bit period the gain feedback is modified to reflect three times the period gain, and so on.

It should be noted that while the acquisition phase gain modification circuits and methods are discussed in relation to processing data from a single read head on a read/write head, other embodiments of the present invention apply the acquisition phase gain modification circuits and/or methods to processing data from multiple read heads an a read/write head. In such embodiments, acquisition phase gain modification circuit 362 is replicated for use in relation to each of the multiple read heads individually.

Additionally, it should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent, albeit such a system would not be a circuit. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the system comprising:
   an analog to digital converter circuit operable to convert an analog input into a series of digital samples, wherein the series of digital samples includes a preamble pattern;
   an amplitude estimation circuit operable to estimate an amplitude of the series of digital samples corresponding to the preamble pattern received during acquisition phase processing;
   a comparator circuit operable to compare the amplitude with a window threshold;
   an acquisition gain feedback calculation circuit operable to calculate a gain correction based at least in part on a result of comparing the amplitude with the window threshold; and
   a data correction circuit operable to correct the digital samples corresponding to the preamble pattern by an amount corresponding to the gain correction.

2. The data processing system of claim 1, wherein the window threshold is a first window threshold, wherein the result is a first result, wherein the comparator is a first comparator circuit, the system further comprising:
   a second comparator circuit operable to compare the amplitude with a second window threshold to yield a second result; and
   wherein the gain calculation circuit is operable to calculate the gain correction based at least in part on the first result and the second result.

3. The data processing system of claim 2, wherein the acquisition gain feedback calculation circuit is operable to:
   apply a first correction algorithm to correct the digital samples corresponding to the preamble pattern when the amplitude is outside the second window threshold and within the first window threshold; and
   apply a second correction algorithm to correct the digital samples corresponding to the preamble pattern when the amplitude is outside both the second window threshold and the first window threshold.

4. The data processing system of claim 3, wherein the first correction algorithm includes multiplying a buffered version of the series of digital samples by an overall gain offset.

5. The data processing system of claim 4, wherein the second correction algorithm includes incrementally multiplying on a period by period basis the buffered version of the series of digital samples by a period gain, wherein the period gain is the overall gain offset divided by a number of bit periods, and wherein the number of bit periods is greater than two.

6. The data processing system of claim 2, wherein the analog input is a first analog input, and wherein the system further comprises:
   a variable gain amplifier circuit operable to amplify a second analog input by a variable gain corresponding to a gain feedback value to yield an amplified output, wherein the first analog input is derived from the amplified output; and
   wherein the acquisition gain feedback calculation circuit is operable to leave the gain feedback value unchanged when the amplitude is within the first window threshold.

7. The data processing system of claim 2, wherein the analog input is a first analog input, and wherein the system further comprises:
   a variable gain amplifier circuit operable to amplify a second analog input by a variable gain corresponding to a gain feedback value to yield an amplified output, wherein the first analog input is derived from the amplified output; and
   wherein the acquisition gain feedback calculation circuit is operable to modify the gain feedback value when the amplitude is outside the first window threshold.

8. The data processing system of claim 1, wherein the system is implemented as part of an integrated circuit.

9. The data processing system of claim 1, wherein the system is implemented as part of a storage device, and wherein the storage device further comprises:
   the storage medium, wherein the analog input is derived from a read head disposed over a track on the storage medium.

10. The data processing system of claim 1, wherein the amplitude estimation circuit is a zero gain start circuit.

11. A method for modifying a gain feedback value, the method comprising:
- receiving a first portion of data derived from a storage medium during a tracking phase;
- receiving a second portion of data derived from the storage medium during an acquisition phase;
- applying a first variable gain amplification to the first portion of data to yield a first amplified output, wherein the variable gain amplification is governed at least in part by a first gain feedback generated based upon the first portion of data;
- converting a first analog input corresponding to the first amplified output to a first series of digital samples;
- applying a second variable gain amplification to the second portion of data to yield a second amplified output, wherein the second variable gain amplification is governed at least in part by a second gain feedback;
- converting a second analog input corresponding to the second amplified output to a second series of digital samples;
- using an acquisition phase gain modification circuit to: estimate an amplitude of the second series of digital samples to yield an amplitude, and calculate a gain correction based at least in part on the amplitude; and
- correcting the second series of digital samples using the gain correction to yield corrected samples.

12. The method of claim 11, wherein the method further comprises:
- using the acquisition phase gain modification circuit to: compare the amplitude with a first window threshold to yield a first result, and compare the amplitude with a second window threshold to yield a second result; and
- wherein calculating the gain correction is based at least in part on a result of comparing the amplitude with the window threshold.

13. The method of claim 12, wherein the second gain feedback is left unchanged when the amplitude is within the first window threshold.

14. The method of claim 12, wherein the second gain feedback is modified when the amplitude is outside the first window threshold.

15. The method of claim 12, the method further comprising:
- using the acquisition phase gain modification circuit to:
  - apply a first correction algorithm to correct the second series of digital samples when the amplitude is outside the second window threshold and within the first window threshold; and
  - apply a second correction algorithm to correct the second series of digital samples when the amplitude is outside both the second window threshold and the first window threshold.

16. The method of claim 15, the method further comprising:
- calculating an overall gain offset as a difference between the amplitude and an expected amplitude.

17. The method of claim 16, wherein the first correction algorithm includes multiplying a buffered version of the second series of digital samples by the overall gain offset.

18. The method of claim 16, the method further comprising:
- calculating a period gain by dividing the overall gain offset by a number of bit periods, wherein the number of bit periods is greater than two.

19. The method of claim 18, wherein the second correction algorithm includes incrementally multiplying on a period by period basis the buffered version of the second series of digital samples by the period gain.

20. A storage device, the storage device comprising:
- a head including a read sensor disposable over a storage medium and operable to sense information on the storage medium and provide a corresponding sensed signal;
- a variable gain amplifier circuit operable to amplify an input signal derived from the sensed signal by a variable gain corresponding to a gain feedback value to yield an amplified output;
- an analog to digital converter circuit operable to convert an analog input into a series of digital samples, wherein the series of digital samples includes a preamble pattern, and wherein the analog input is derived from the amplified output;
- an amplitude estimation circuit operable to estimate an amplitude of the series of digital samples corresponding to the preamble pattern received during acquisition phase processing;
- a first comparator circuit operable to compare the amplitude with a first window threshold to yield a first result;
- a second comparator circuit operable to compare the amplitude with a second window threshold to yield a second result;
- an acquisition gain feedback calculation circuit operable to calculate a gain correction based at least in part on the first result and the second result, wherein the acquisition gain feedback calculation circuit is operable to leave the gain feedback value unchanged when the amplitude is within the first window threshold, and to modify the gain feedback value when the amplitude is outside the first window threshold; and
- a data correction circuit operable to correct the digital samples corresponding to the preamble pattern by an amount corresponding to the gain correction.

* * * * *